US010106111B2

United States Patent
Hoffmann et al.

(10) Patent No.: US 10,106,111 B2
(45) Date of Patent: Oct. 23, 2018

(54) HINGER HTR TUBE BRACKET

(71) Applicant: Hanon Systems, Daejeon (KR)

(72) Inventors: Michael Hoffmann, Dormagen (DE);
Ralph Wiesmann, Euskirchen (DE);
Antonio Marques Ferreira,
Königswinter (DE)

(73) Assignee: HANON SYSTEMS, Daejeon (KR)

( * ) Notice: Subject to any disclaimer, the term of this patent is extended or adjusted under 35 U.S.C. 154(b) by 82 days.

(21) Appl. No.: 15/417,379

(22) Filed: Jan. 27, 2017

(65) Prior Publication Data

US 2017/0217392 A1    Aug. 3, 2017

(30) Foreign Application Priority Data

Jan. 29, 2016   (DE) .................. 10 2016 101 603

(51) Int. Cl.
*F16L 3/22*     (2006.01)
*B60R 16/08*    (2006.01)
*B60H 1/00*     (2006.01)
*F16L 3/10*     (2006.01)
*F16L 3/237*    (2006.01)

(52) U.S. Cl.
CPC ......... *B60R 16/08* (2013.01); *B60H 1/00521* (2013.01); *B60H 1/00571* (2013.01); *F16L 3/1075* (2013.01); *F16L 3/237* (2013.01)

(58) Field of Classification Search
USPC ...................................... 248/68.1
See application file for complete search history.

(56) References Cited

U.S. PATENT DOCUMENTS

| 4,268,947 A | 5/1981 | Hile |
| 6,776,421 B2 * | 8/2004 | Florence ................. F16L 39/00 |
| | | 277/602 |
| 7,637,538 B2 | 12/2009 | Tchang et al. |
| 8,430,365 B2 * | 4/2013 | Benoit ..................... F16L 5/14 |
| | | 248/49 |
| 9,114,687 B2 * | 8/2015 | Dorland ............. B60H 1/00571 |

(Continued)

FOREIGN PATENT DOCUMENTS

| EP | 2647753 A1 | 10/2013 |
| EP | 921792 A1 | 9/2015 |

(Continued)

*Primary Examiner* — Monica E Millner
(74) *Attorney, Agent, or Firm* — Shumaker, Loop & Kendrick, LLP; James D. Miller

(57) ABSTRACT

A fastening element for holding fluid conduit ends of a motor vehicle air conditioning system on an air conditioning system housing in a region of a conduit interface the fastening element including at least one U-shaped conduit clamping region between two opposing U-leg regions connected to one another by a curved or straight U-shaped base region, wherein at least one fluid conduit end, which is aligned with its conduit axis perpendicular to the longitudinal direction of the U-shaped conduit clamping region, can be clamped in the U-shaped conduit clamping region. At least one pivotable spacer is connected as an integrated component of the fastening element to one of the U-leg regions by means of a film hinge, and is capable of at least partially filling and/or bridging the U-shaped conduit clamping region by means of a pivoting movement in the direction of the respectively opposite U-leg region.

10 Claims, 8 Drawing Sheets

(56) References Cited

U.S. PATENT DOCUMENTS

| | | | |
|---|---|---|---|
| 9,933,090 B2* | 4/2018 | Alu | F16L 3/003 |
| 2006/0001261 A1* | 1/2006 | Miyajima | F16L 5/10 |
| | | | 285/136.1 |
| 2015/0328957 A1* | 11/2015 | Baek | B60H 1/00557 |
| | | | 62/515 |

FOREIGN PATENT DOCUMENTS

| | | |
|---|---|---|
| JP | 2004084766 A | 3/2004 |
| JP | 2011057016 A | 3/2011 |
| KR | 2020000001110 U | 1/2000 |
| KR | 101430004 B1 | 8/2014 |
| KR | 20150025966 A | 3/2015 |

\* cited by examiner

HINGER HTR TUBE BRACKET

CROSS-REFERENCE TO RELATED PATENT APPLICATION

This patent application claims priority to German Pat. Appl. No. 10 2016 101 603.9 filed Jan. 29, 2016, the disclosure of which is hereby incorporated herein by reference in its entirety.

FIELD OF THE INVENTION

The invention relates to a fastening element for holding fluid conduit ends of a motor vehicle air conditioning system on an air conditioning system housing in the region of a conduit interface. Furthermore, the invention relates to a method for attaching fluid conduit ends to an air conditioning system housing in the region of a conduit interface.

BACKGROUND OF THE INVENTION

An air conditioning system includes a heat exchanger for heating air in the form of a heating heat exchanger and, if appropriate, a heat exchanger for cooling the air in the form of an evaporator. These heat exchangers are supplied with appropriate media, such as refrigerants, via fluid conduit ends coming from the engine compartment. A motor vehicle air-conditioning system is usually arranged in the vehicle interior. There is a conduit interface/transfer point between the air conditioning system and the engine-side connecting lines. The fluid conduit ends of the air conditioning system must be kept in a defined position on the conduit interface. In addition, the conduit ends must be fixed in such a way that mounting forces and vibrations can be absorbed during vehicle operation. The clamping of the conduit ends must therefore be carried out in such a way that the conduits are held in all directions.

For this purpose, it has become common to use fastening elements that clamp the conduit ends to suitable housing locations on the air-conditioning system. The clamping of the conduit ends is achieved by attaching the fastening element or, if appropriate, by several fastening elements to specially shaped housing regions. In this case, the arrangement of the conduit ends at the conduit interface to the engine compartment is generally predetermined by the vehicle manufacturer. The architecture and housing design of the air-conditioning system, in turn, may prescribe a mounting direction of the fastening element.

For example, the mounting direction can be perpendicular to the orientation of the arrangement of two conduit ends arranged next to one another. If, on the other hand, the mounting direction is parallel to the alignment of two conduit ends disposed one behind the other, it is necessary to position the conduit ends completely by means of an additional component, a spacer between the two ends of the conduit.

The disadvantage of the current prior art for the case where the mounting direction of the fastening element is in the direction of conduit ends lying one behind the other is, namely, that the distance between the conduit ends must be ensured by means of an additional component.

The object of the invention is to simplify and provide a more cost-effective design of the mounting of a fastening element for holding fluid conduit ends of a motor vehicle air conditioning system on an air conditioning system housing in the region of a conduit interface.

SUMMARY OF THE INVENTION

The object is achieved by means of a fastening element according to patent claim 1, which is suitable for holding fluid conduit ends in a motor vehicle air conditioning system on an air conditioning system housing in the region of a conduit interface. Further developments are given in the dependent patent claims.

Such a fastening element comprises at least one U-shaped conduit clamping region between two opposing U-leg regions connected to one another by a curved or straight U-shaped base region. In this case, at least one fluid conduit end which is oriented perpendicular to the longitudinal direction of the U-shaped clamping region with its conduit axis can be chucked in the U-shaped conduit clamping region between the U-leg regions. In the context of this invention, the longitudinal direction of the U-shaped conduit clamping region is understood as the longitudinal direction of the U-shape, that is, the direction leading from the closed end at the U-base region to the open end between the free ends of the U-leg regions.

According to the invention, as an integrated component of the fastening element, at least one pivotable spacer is connected to one of the U-leg regions via a film hinge and is capable of partially filling and/or bridging the U-shaped conduit clamping region by a pivotal movement in the direction of the other U-leg region. In this folded-in state, the spacer fills and/or bridges the U-shaped conduit clamping region such that it is capable of acting as a spacer between two fluid conduit ends aligned with their conduit axis perpendicular to the longitudinal direction of the U-shaped clamping region, which ends are arranged one behind the other in the longitudinal direction of at least one U-shaped clamping region, and at least one fluid conduit end of which is clamped in the U-shaped conduit clamping region. Conceptually, a movable spacer is integrated into the fastening element by means of the film hinge.

Conceptually, a movable spacer is integrated into the fastening element by means of the film hinge. Advantages achievable with the invention are, in particular, a reduction in the required components, tool costs and assembly times. Such a fastening element is suitable both for conduit interfaces in left-hand drive vehicles (LHD) and in right-hand drive vehicles (RHD).

The at least one pivotable spacer is preferably integrally connected to the fastening element via the film hinge, or is formed as one single piece. In this case, the spacer can, for example, be injection-molded onto the fastening element.

According to an advantageous embodiment, the fastening element has two U-shaped conduit clamping regions which are arranged in one plane, wherein the two U-shaped conduit clamping regions preferably are formed together in a double U shape with two outer U-leg regions and two inner U-leg regions. Preferably, at least one integrated spacer is connected in each of the two U-shaped conduit clamping regions to an outer U-leg region and can be pivoted in the direction of the respectively oppositely lying U-leg region. For example, four fluid conduit ends arranged at a conduit interface in a rectangular formation can be completely positioned with a fastening element configured in this way.

Another advantageous development of the invention consists of a locking hook which is used for fixing the spacer to the U-leg region of the conduit clamping region opposite the film hinge, which locking hook corresponds to a snap-in element of the spacer.

According to a preferred embodiment of the invention, the fastening arrangement has at least one guiding element which corresponds to a guiding element on the air conditioning system housing for attaching the fastening element to the air conditioning system housing in the region of the conduit interface.

As a guiding element or elements, the fastening element can, for example, have guiding rails, which are aligned parallel to the longitudinal direction of at least one U-shaped clamping region and which are provided with guide grooves as guides for attaching the fastening element to the air conditioning system housing.

In order to support the fluid conduits in the direction of the respective conduit axis, the fastening element can have a support region above or below the plane and/or the extended plane of the conduit clamping region. In this way, the mounting forces at the conduit interface to the engine compartment can be better absorbed, in particular if the air conditioner housing does not provide suitable support in the direction of the conduit axis.

In this case, the support region is preferably designed to support curved fluid conduit lines with fluid conduit sections adjoining the fluid conduit ends, the conduit axis of which runs perpendicular to the conduit axis of the adjoining fluid conduit end in the direction of the respective conduit axis of these fluid conduit sections. With such an embodiment, the support region, according to an advantageous embodiment, has a rotated T-shaped cross-section transversely to the longitudinal direction of the U-shaped conduit clamping region with a vertical part and a horizontal part, below the plane and/or the extended plane of the U-shaped conduit clamping region. Thus, in the case of curved fluid conduits with fluid conduit sections neighboring the fluid conduit ends, the conduit axis of which runs perpendicular to that of the adjacent fluid conduit end, the support region is capable of partially accommodating two fluid conduit sections on both sides of the vertical part between the plane and/or the extended plane of the U-shaped conduit clamping region and the horizontal part, and of supporting these in the direction of the conduit axes of these fluid conduit sections.

A method for attaching fluid conduit ends to an air conditioning system housing in the region of a conduit interface using a fastening element comprises the following method steps:

a) pushing the fastening element with the at least one U-shaped conduit clamping region, which is released by folding out the at least one integrated spacer, which is pivotable by means of a film hinge, onto at least one fluid conduit end along a mounting direction that runs parallel to the longitudinal direction of the U-shaped clamping region and perpendicular to the conduit axis of the at least one fluid conduit end, whereby the at least one fluid conduit end is clamped into the U-shaped conduit clamping region, and b) attaching the fastening element to a housing part of the air conditioning system housing in the region of the conduit interface, wherein this step is carried out either simultaneously with or after step a), and c) folding the pivotable spacer under partial filling and/or bridging of the U-shaped conduit clamping region between two fluid conduit ends which are aligned with their conduit axis perpendicular to the mounting direction and which are arranged one behind the other in the mounting direction, and at least one fluid conduit end of which is clamped in the U-shaped conduit clamping region.

Furthermore, the invention relates to an arrangement for supporting fluid conduit ends of a motor vehicle air conditioning system on an air conditioning system housing in the region of a conduit interface, comprising a fastening element according to the invention, optionally in one of the above-mentioned embodiments, which is attached to a housing part of an air conditioning system housing, wherein the at least one spacer partially fills and/or bridges the at least one U-shaped conduit clamping region, and in this case functions as a spacer between two fluid conduit ends which are aligned with their conduit axis perpendicularly to the longitudinal direction of the U-shaped conduit clamping region, and which are arranged one behind the other in the longitudinal direction of the U-shaped conduit clamping region, and at least one fluid conduit end of which is clamped in the U-shaped conduit clamping region. According to an advantageous embodiment of the invention, one of the fluid conduit ends, namely, the last—extending from the U-shaped base region of the U-shaped conduit clamping region—of the fluid conduit ends arranged behind one another in the longitudinal direction of the U-shaped conduit clamping region, is clamped between the one spacer or the last of the several spacers and the housing part of the air conditioning system housing, preferably when the last fluid conduit end is not in the U-shaped conduit clamping region.

BRIEF DESCRIPTION OF THE DRAWINGS

Further details, features and advantages of variants of the invention will become apparent from the following description of exemplary embodiments with reference to the accompanying drawings. The following are shown.

DETAILED DESCRIPTION OF EMBODIMENTS

Figure 1B:
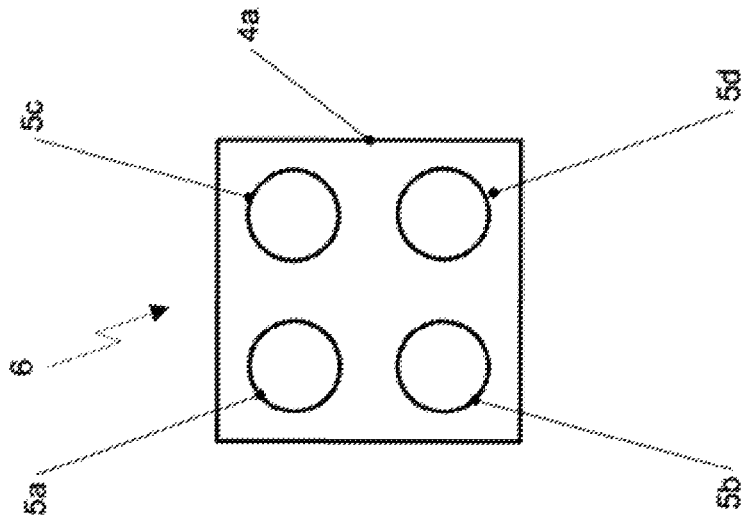
FIG. 1B: An example of an arrangement of fluid conduit ends at the conduit interface.
Figure 1A:
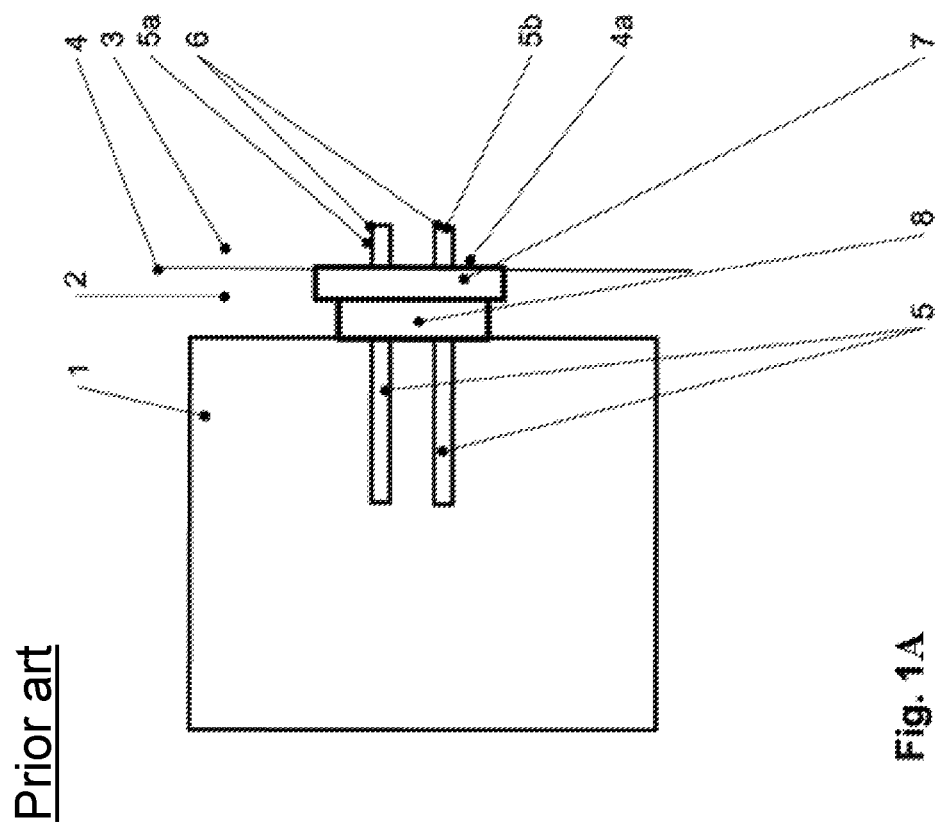
FIG. 1A: An arrangement of an air conditioning system in a vehicle interior with fluid conduit ends at an interface to the engine compartment, prior art.

FIG. 1A schematically shows a general, prior art arrangement of an air-conditioning system 1 in a vehicle interior 2 near an adjacent engine compartment 3 of the vehicle, the vehicle interior 2 and the engine compartment 3 being spatially separated from one another by a front wall 4. The air conditioning system 1 generally contains a heat exchanger for heating the air and, if necessary, a further heat exchanger in the form of an evaporator for cooling the air.

These two heat exchangers, which are not shown in FIG. 1, are supplied with fluid from the engine compartment 3 by means of fluid conduits. Between the air-conditioning system 1 and the connecting points of the engine-side fluid conduit ends, there is a conduit interface 6 or, respectively, a transfer point 6, wherein fluid conduit ends 5a, 5b are guided out of the air-conditioning system 1 through an opening 4a sealed with a seal 7 in the front wall 4. The fluid conduit ends 5a, 5b of the air conditioning system 1 must be held here in a defined position. In addition, the fluid conduit ends 5a, 5b are to be fixed in such a way that mounting forces and vibrations can be absorbed during the vehicle operation. The clamping of the fluid conduit ends 5a, 5b is thus designed in such a way that the fluid conduit ends 5a, 5b are held in all directions.

For this purpose, fastening elements 8 have been established which clamp the fluid conduit ends 5a, 5b at suitable housing locations on the air conditioning system housing. The clamping of the fluid conduit ends 5a, 5b is realized by attaching a fastening element 8 or, if appropriate, by means of several fastening elements 8 to specially shaped housing regions of the air conditioning system housing. In this case, the arrangement of the fluid conduit ends 5a, 5b at the conduit interface 6 to the engine compartment 3 is generally predetermined by the vehicle manufacturer.

FIG. 1B shows the region of the opening 4a through the front wall at the conduit interface 6 in a front view. A total of four fluid conduit ends 5a, 5b, 5c, 5d are arranged at the conduit interface 6. A first conduit end 5a can, for example, form an outlet of a fluid conduit coming from an evaporator of the air conditioning system. A second conduit end 5b placed underneath can accordingly serve as the inlet of a fluid conduit leading to the evaporator. Parallel to the alignment of the two fluid conduit ends 5a, 5b, according to FIG. 1B, a second pair of fluid conduit ends 5c, 5d are arranged at the opening 4a through the end wall. In this case, an upper conduit end 5c can form an outlet of a fluid conduit leading from a heating heat exchanger of the air-conditioning system. A conduit end placed underneath can accordingly serve as the inlet of a fluid conduit 5d leading to the heating heat exchanger.

Figure 2B:
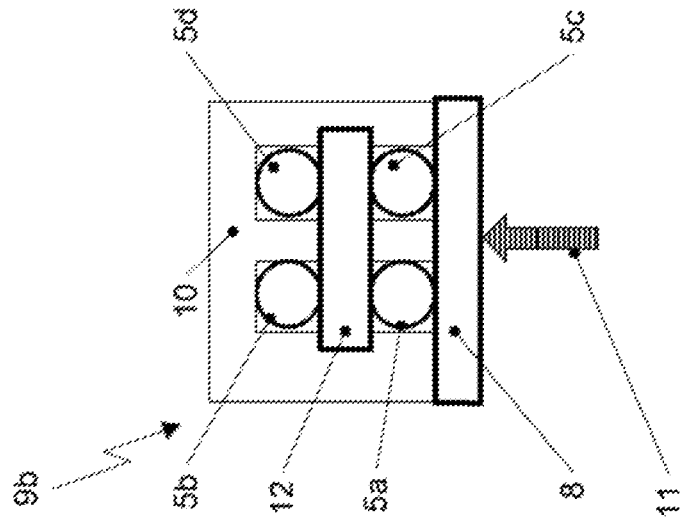
FIG. 2B: A schematic representation of an arrangement for fastening four fluid conduit ends as top view, prior art.
Figure 2A:
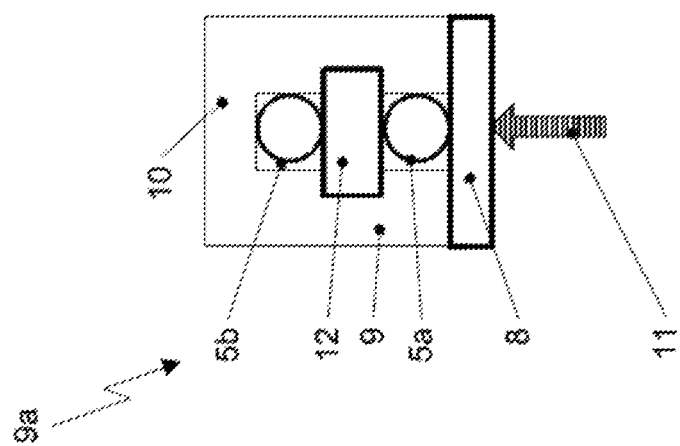
FIG. 2A: A schematic representation of a fastening arrangement of two fluid conduit ends as a top view, prior art.

FIG. 2A shows a schematic representation of an arrangement 9a according to the prior art for attaching two fluid conduit ends 5a, 5b to an air conditioning system housing 10 by means of a fastening element 8 in the form of an upper view of the arrangement 9a. The architecture, assembly and configuration of the air-conditioning system housing 10 may predetermine a mounting direction 11 of the fastening element 8.

For example, the mounting direction can be perpendicular to the orientation of the arrangement of two conduit ends arranged next to one another. If, as shown schematically in FIG. 2A, a mounting direction 11 is parallel to the alignment of two conduit ends 5a, 5b arranged one behind the other, it is necessary to fully position the conduit ends 5a, 5b by means of an additional component, a spacer 12 between the two conduit ends 5a, 5b.

FIG. 2B shows a schematic view of a top view of a prior art arrangement 9b for the attachment of a total of four fluid conduit ends 5a, 5b, 5c, 5d to an air conditioning system housing 10 by means of a fastening element 8. In this case, two pairs of two conduit ends 5a, 5b; 5c, 5d each, arranged one behind the other, are aligned both parallel to one another and parallel to the mounting direction 11. Here, the spacer 12 is dimensioned such that it functions in both pairs of conduit ends 5a, 5b; 5c, 5d as a spacer 12 between the individual conduit ends 5a, 5b and 5c, 5d, in order to completely position the conduit ends 5a, 5b, 5c, 5d.

Figure 3B:
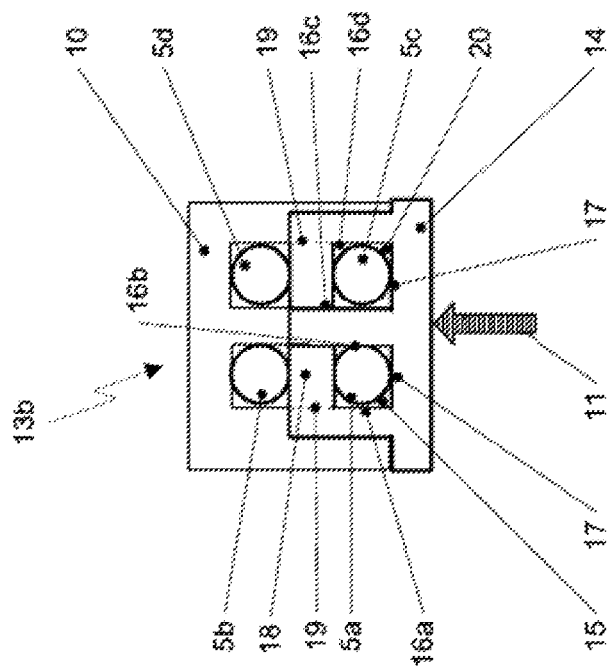
FIG. 3B: A schematic representation of an arrangement according to the invention for holding four fluid conduit ends as a top view.
Figure 3A:
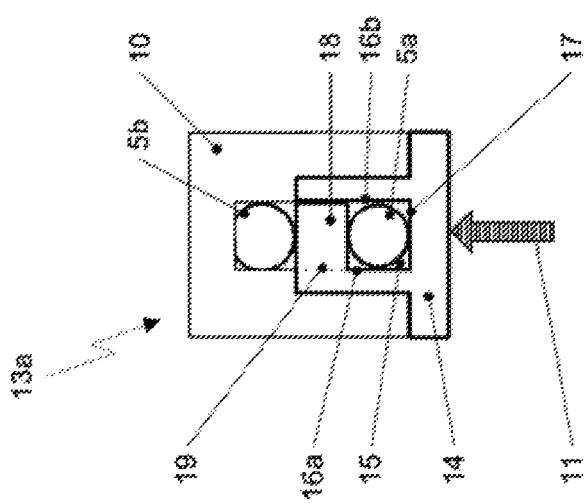
FIG. 3A: A schematic representation of an arrangement according to the invention for holding two fluid conduit ends as a top view.

FIG. 3A shows a schematic top view of an arrangement 13a for holding fluid conduit ends 5a, 5b of a motor vehicle air-conditioning system on the air-conditioning system housing 10 in the region of a conduit interface. A fastening element 14 for holding fluid conduit ends 5a, 5b of a motor vehicle air conditioning system at a conduit interface comprises a substantially U-shaped conduit clamping region 15. The form of the U-shaped conduit clamping region 15 is adapted to the form of the intermediate space between the U-leg regions 16a, 16b, which are connected to each other by a U-base region 17, which is designed in a straight or curved manner. As shown in FIG. 3A, during assembly, the U-leg regions 16a, 16b are slidable via a fluid conduit 5a from the group of two fluid conduit ends 5a, 5b, which extend along a mounting direction 11 that extends perpendicular to the conduit axis and corresponds to the longitudinal direction of the U-shaped conduit clamping region, are arranged one behind the other and are spaced apart from each other. A pivotable spacer 18 is either firmly connected by a film hinge (e.g. a living hinge) 19 to a first U-leg region 16a of the two U-leg regions 16a, 16b, or is embodied as an integral part, and is well-suited, by means of a pivoting movement in the direction of the second U-leg region 16b, for partially filling and/or bridging the conduit-clamping region 15 between the two U-leg regions 16a, 16b, and in this way, acting as a spacer 18 between the fluid conduit ends 5a, 5b arranged one after the other in the mounting direction 11 and perpendicular to their conduit axes, of which one fluid conduit 5a is clamped within the conduit clamping region 15 between the two U-leg regions 16a, 16b.

FIG. 3B shows a schematic representation of a plan view of an arrangement 13b for holding a total of four fluid conduit ends 5a, 5b; 5b, 5c of a motor vehicle air-conditioning system on the air-conditioning system housing 10 in the region of a conduit interface. In this case, the fastening element 14 has two mutually parallel U-shaped conduit clamping regions 15, 20 for a respective fluid conduit 5a; 5c each from one respective group of fluid conduit ends 5a, 5b; 5c, 5d arranged one after the other in the mounting direction 11 and perpendicular to their conduit axes. In both conduit clamping regions 15, 20 a pivotable spacer 18 is in each case firmly connected via a film hinge 19 to a first, external U-leg region 16a, 16d, or is embodied as integral thereto, and is capable of at least partially filling and/or bridging the respective conduit clamping region 15, 20 between the two U-leg regions 16a, 16b or 16d, 16c, respectively, by means of a pivoting movement in the direction of the respectively opposite U-leg region 16b, 16c. In this case, the two internal U-leg regions 16b, 16c are mapped on the opposing sides of one common leg so that the fastening element 14 has a double U-shape. In this embodiment, in the two conduit clamping regions 15, 20 a pivotable spacer 18 acts as spacer 18 between fluid conduit ends 5a, 5b and 5c, 5d arranged one after the other in the mounting direction 11. According to the schematic representation of FIG. 3A, in each case a fluid conduit 5a, 5c is placed within the conduit clamping region 15, 20, while a second fluid conduit 5b, 5c is placed between the spacer 18 and the air conditioner housing 10.

Figure 4:
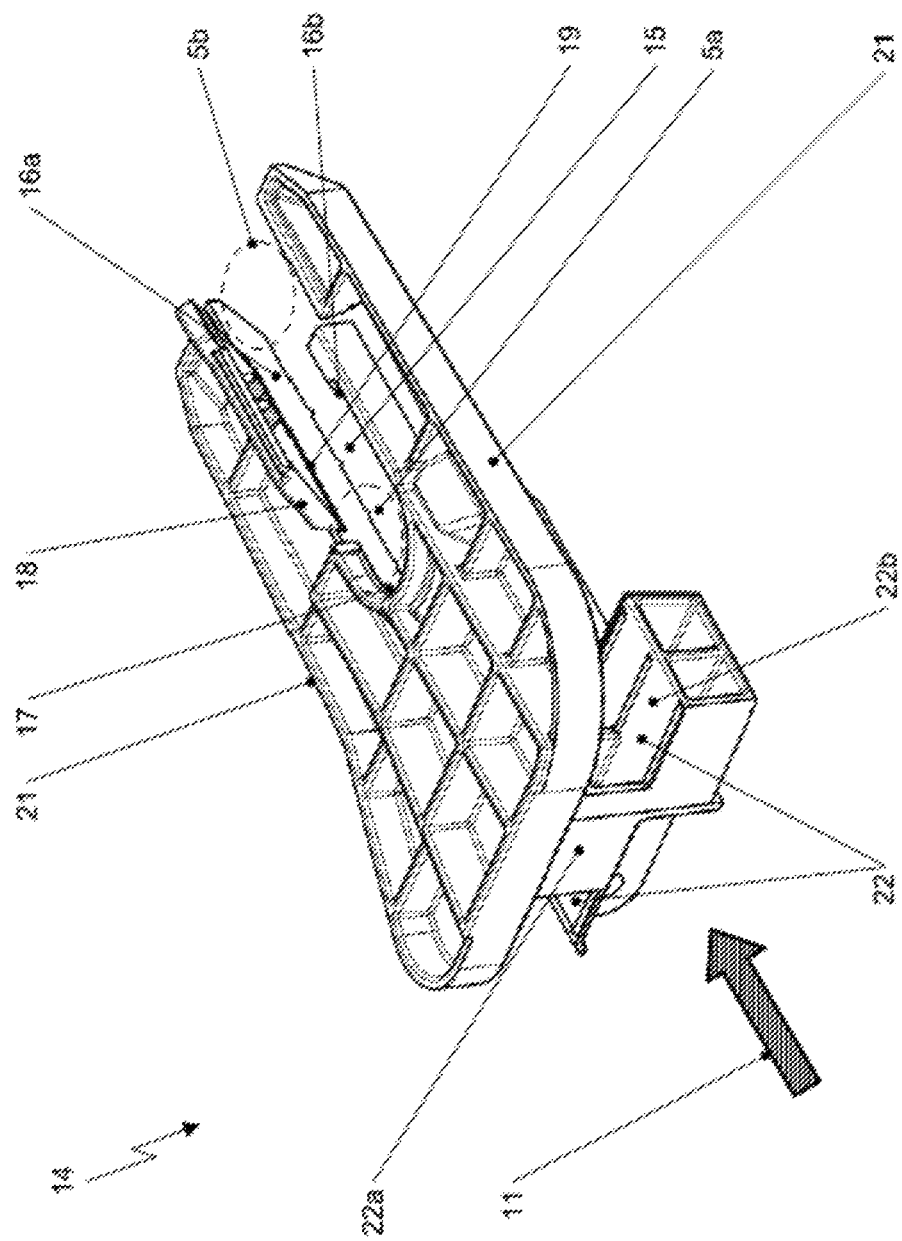
FIG. 4: A perspective view of a fastening element.

FIG. 4 shows a fastening element 14 for holding fluid conduit ends 5a, 5b of a motor vehicle air conditioning system at a conduit interface in a perspective view, the positions of the fluid conduit ends 5a, 5b being indicated by dashed circles. The fastening element 14 has a U-shaped conduit clamping region 15 as an intermediate space between two U-leg regions 16a, 16b connected to one another by a curved U-shaped base region 17. In case of the mounting of the fastening element 14 on the fluid conduit ends 5a, 5b, the U-leg regions 16a, 16b are slidable over two fluid conduit ends 5a, 5b, which extend along a mounting direction 11 that is perpendicular to their radial axis and that corresponds to the longitudinal direction of the U-shaped conduit clamping region 15, are arranged one behind the other, and are spaced apart from each other. A pivotable spacer 18 is firmly connected via a film hinge 19 to a first U-leg region 16a of the U-shaped conduit clamping region 15 or is embodied as integral therewith, and is well-suited for filling and/or bridging the clamping region 15 between the U-leg regions 16a, 16b, by means of a pivotal movement, in such a way that it also acts as a spacer 18 between the two fluid conduit ends 5a, 5b arranged one behind the other in the mounting direction 11. In this case, both fluid conduit ends 5a, 5b can be placed within the U-shaped conduit clamping region 15. By means of the folded-down spacer 18, two fluid conduit ends 5a, 5b, which are arranged one behind the other in the mounting direction 11 that runs perpendicular to the conduit axes of the fluid conduit ends, can be kept at a distance from each other.

In the embodiment shown in FIG. 4, the fastening element 14 has a guiding rail 21 parallel to the mounting direction 11 and parallel to the U-leg regions 16a, 16b on each of its two outer edges, with the guiding rails 21 serving to receive the fastening element 14 in the housing of the air conditioning system. For this purpose, guiding grooves are formed in the housing of the air-conditioning system which correspond to the guiding rails 21.

Figure 5:
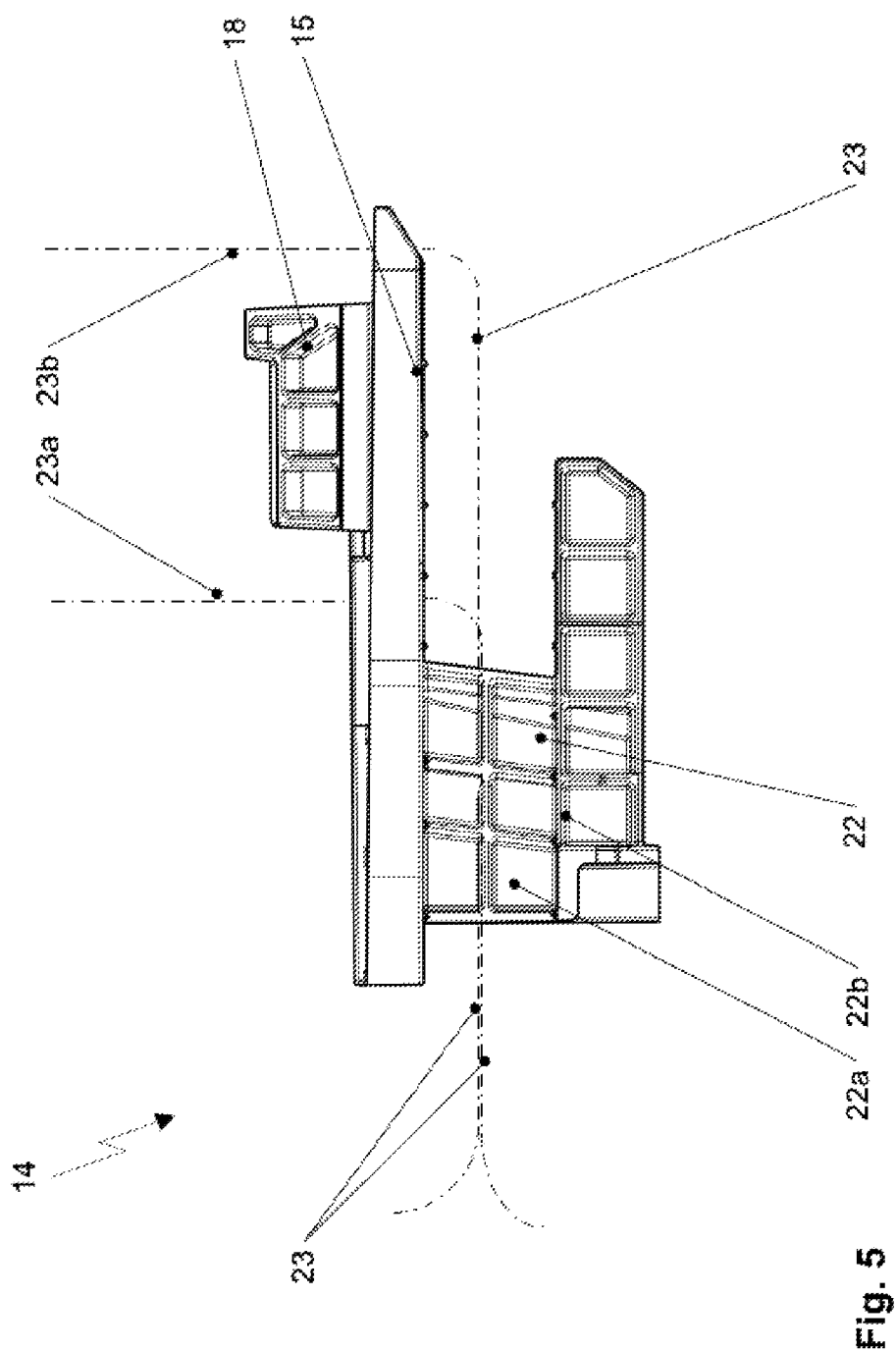
FIG. 5: A side view of the fastening element with an additional support region.

Furthermore, the fastening element has a support region 22 below the plane of the U-shaped conduit clamping region 15 with a substantially rotated T-shaped cross section transversal to the longitudinal direction of the U-shaped conduit clamping region 15. The support region thus has a part 22a oriented perpendicularly to the plane of the U-shaped conduit clamping region 15 and a horizontal part 22b oriented parallel to the plane or the extended plane of the U-shaped conduit clamping region. In this case, the conduit axes of the two received fluid conduits run according to a curve not shown in FIG. 4, on both sides of the vertically oriented part 22a between the plane or extended plane of the U-shaped conduit clamping region 15 and the horizontal part 22b of the support region 22. The curved trajectory of the conduit axes 23, starting from the axial sections of the conduit axis 23a, 23b at the fluid conduit ends, through the plane of the U-shaped conduit clamping region 15 and through the support region 22, is shown in FIG. 5, which shows a side view of the fastening element 14 with the integrated spacer 18. The support region 22 serves to support the fluid conduit lines in the direction of their conduit axes 23. In the exemplary implementation shown, the conduit axes 23 are oriented at a right angle to the axial sections of the conduit axes 23a, 23b at the fluid conduit ends due to a curve below the U-shaped conduit clamping region 15. Therefore, the conduit axes 23 of both fluid conduit sections, implemented in the support region, each run according to a curve on both sides of the perpendicularly oriented part 22a between the plane or extended plane of the U-shaped conduit clamping region 15 and the horizontal part 22b of the support region 22.

In this way, the support region 22 is adapted to support curved fluid conduits with fluid conduit sections adjacent to the fluid conduit ends, whose conduit axis 23 is perpendicular to the conduit axis 23a, 23b of the adjacent fluid conduit end in the direction of the respective conduit axis 23 of these fluid conduit sections. In particular, the support region 22 serves to accommodate the mounting forces at the conduit interface to the engine compartment if the air conditioning system housing does not provide such support.

Figure 6:
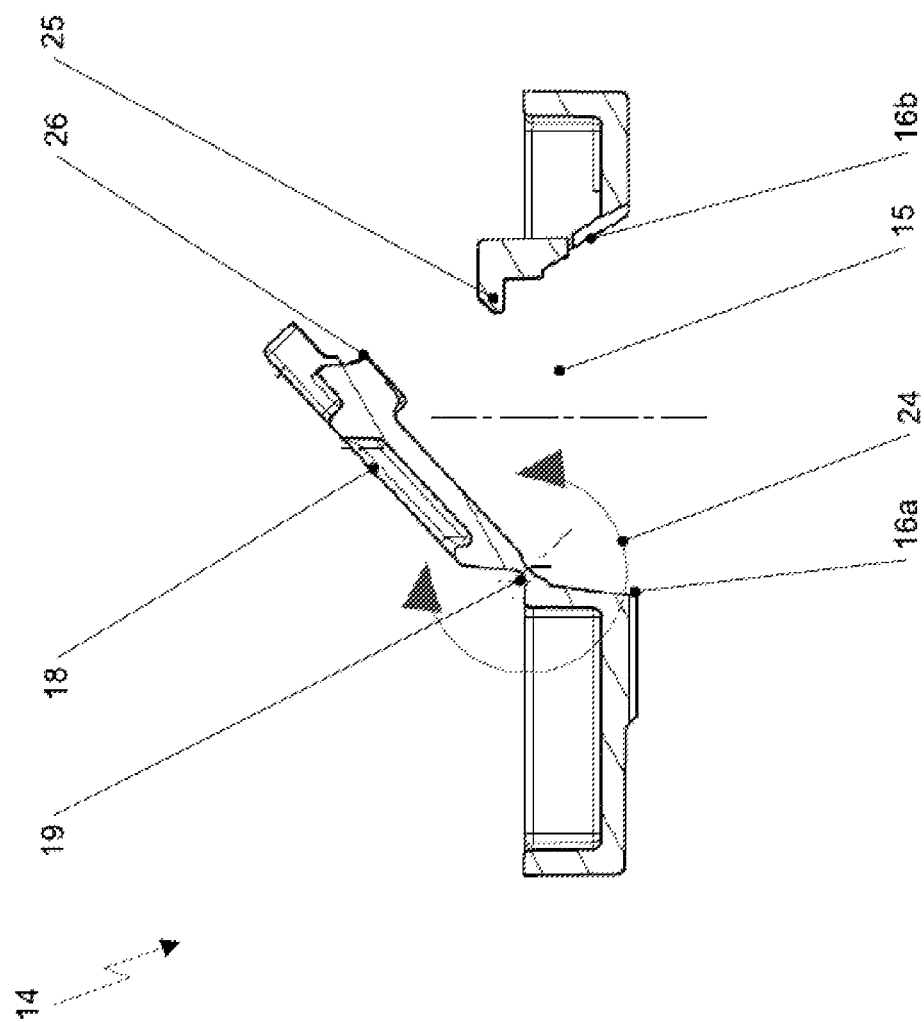
FIG. 6: A sectional view of the pivotable spacer.

In FIG. 6, the pivotable spacer 18, the film hinge 19 and the pivot movement 24 are shown in detail in a sectional view. The spacer 18 is connected to a first U-leg region 16a of the two U-leg regions 16a, 16b via a film hinge 19. The film hinge 19 allows a pivoting movement 24 in the direction of the second opposing U-leg region 16b in order to partially fill and/or bridge the conduit clamping region 15 between the two U-leg regions 16a, 16b. In order to fix the spacer 18, a locking hook 25 is provided on the U-leg region 16b of the conduit clamping region 15 that lies opposite the film hinge 19, which locking hook corresponds to a snap-in element 26 of the spacer 18.

Figure 7:
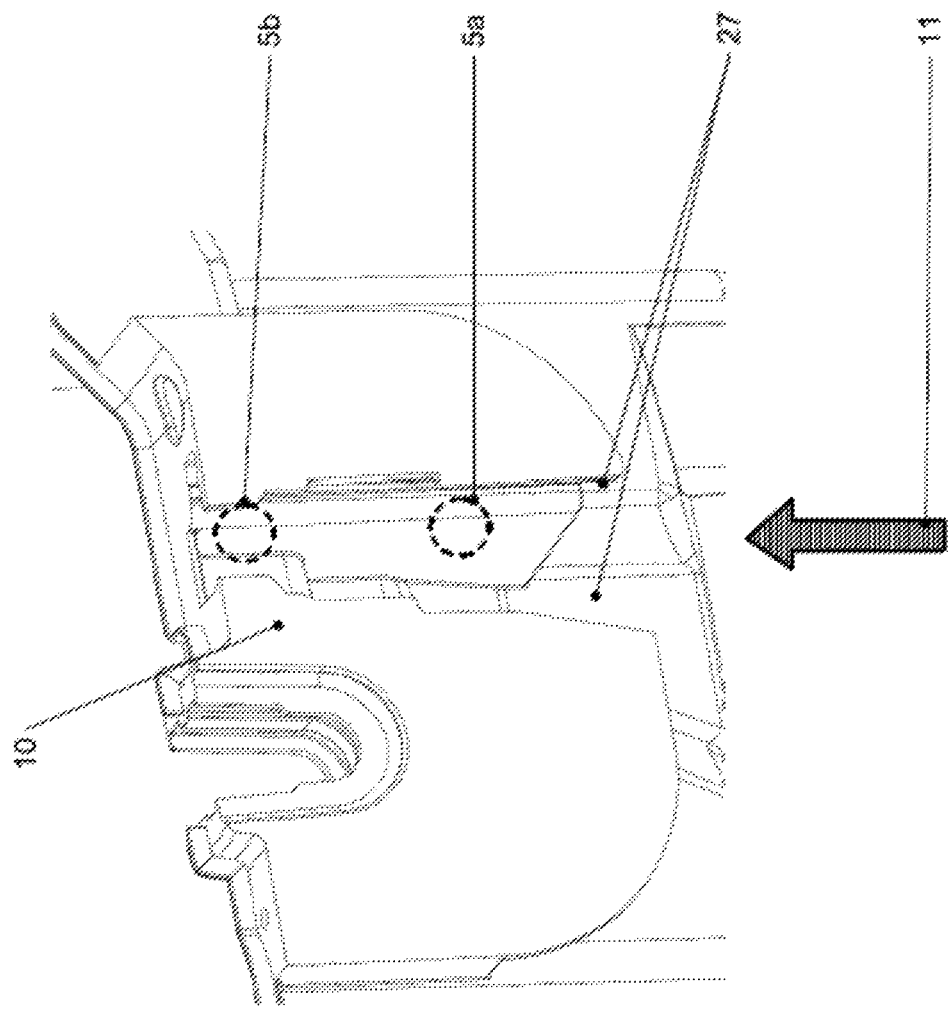
FIG. 7: A housing part of the air conditioning system at the conduit interface to the engine compartment

FIG. 7 shows a housing part of the air-conditioning system 10, which is provided for the attachment of the fastening element 14 according to the invention. The regions which are reserved for the fluid conduit ends 5a, 5b at the conduit interface are located between guiding grooves 27 on the air conditioning system housing 10, which correspond to the guiding rails 21 shown in FIG. 4 so that the fastening element 14, with the guiding rails 21 can be introduced into the housing part of the air conditioning system housing 10 in the sliding direction 11, which corresponds to the mounting direction 11.

Figure 8:
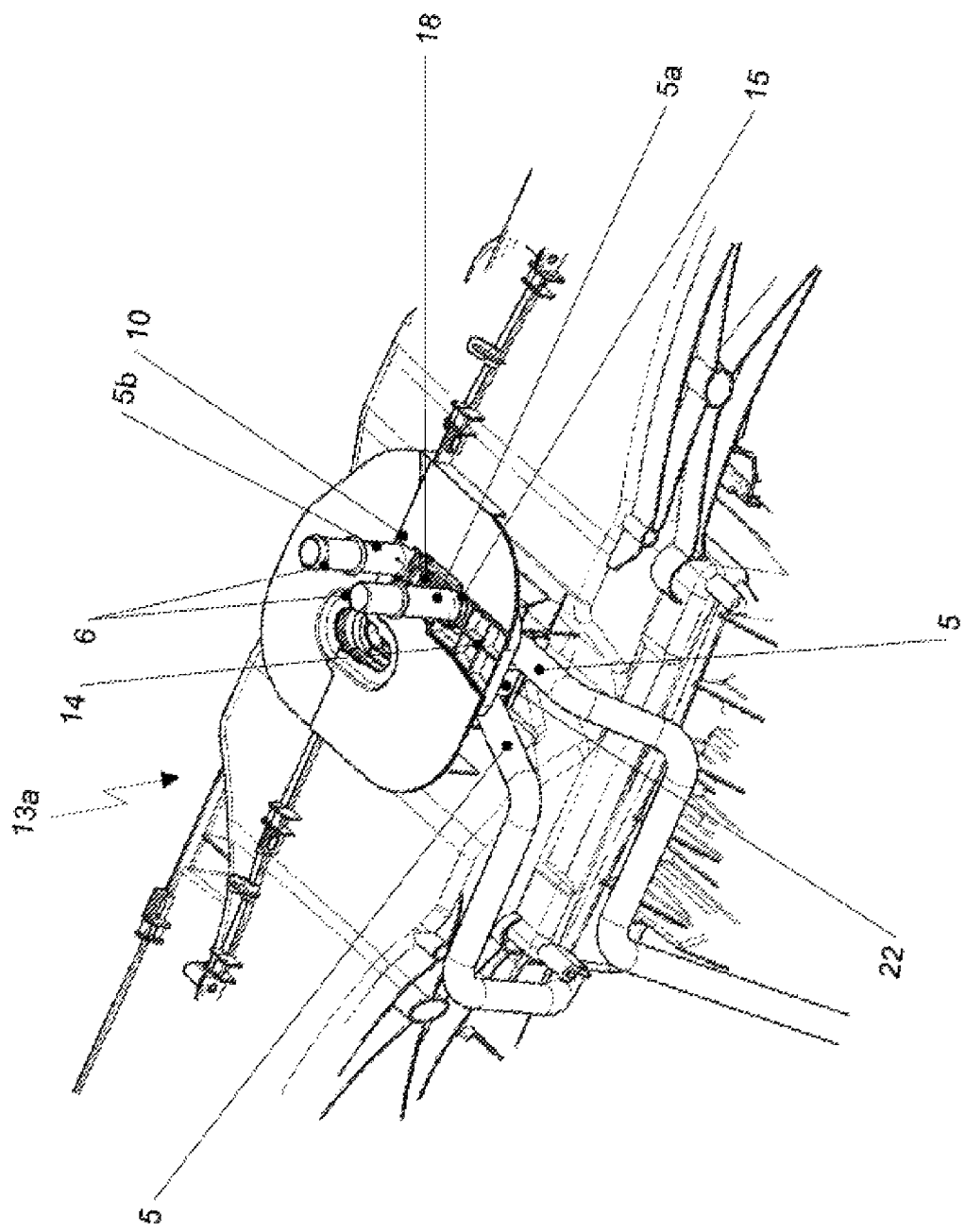
FIG. 8: a perspective view of the arrangement for holding the fluid conduit ends of a motor vehicle air conditioning system on the air conditioning system housing in the region of a conduit interface with the fastening element once installed.

Finally, FIG. 8 shows a perspective view of an arrangement 13a for supporting fluid conduit ends 5a, 5b of a motor vehicle air conditioning system on the air conditioning system housing 10 in the region of a conduit interface 6 with an installed fastening element 14. The spacer 18 is folded between the fluid conduit ends 5a, 5b and thus keeps the two fluid conduit ends at a distance. A first fluid conduit, the fluid conduit 5a, is clamped within the conduit clamping region 15 between the two U-leg regions, as well as the U-base region and the spacer 18. The second fluid conduit 5b is clamped between the spacer 18 and specially shaped parts of the air conditioning system housing 10.

The fluid conduits 5 are guided below the plane or the extended plane of the U-shaped conduit clamping region 15 by a support region 22, which serves to support the fluid conduits 5 in the direction of their conduit axes. The sections of the fluid conduits 5, which are guided through the support region 22, are oriented essentially perpendicular to the axial sections of the conduit axes at the fluid conduit ends 5a, 5b. This is the result of a curving of the fluid conduits below the U-shaped conduit clamping region 15.

LIST OF REFERENCE NOTATIONS

1 Air conditioner
2 Vehicle Interior
3 Engine compartment
4 Front wall, dividing wall between vehicle interior and engine compartment
4a Opening through the front wall, front wall opening
5 Fluid conduits
5a Fluid conduit end, conduit end
5b Fluid conduit end, conduit end
5c Fluid conduit end, conduit end
5d Fluid conduit end, conduit end
6 Conduit interface, transfer point
7 Seal
8 Fastening element, prior art
9a Arrangement for the attachment of two fluid conduit ends, prior art 9b Arrangement for the attachment of four fluid conduit ends, prior art
10 Air conditioning system housing, housing part of air conditioning system housing
11 Mounting direction, slide direction
12 Spacer, prior art
13a Arrangement for holding two fluid conduit ends
13b Arrangement for holding four fluid conduit ends
14 Fastening element
15 U-shaped conduit clamping region
16a U-leg region
16b U-leg region
17 U-base region
18 Spacer
19 Film hinge
20 U-shaped conduit clamping region
21 Guide rails
22 Support region
22a Perpendicular part of the support region 22
22b Horizontal part of the support region 22
23 Conduit axis
23a Conduit axis (at the fluid conduit end)
23b Conduit axis (at the fluid conduit end)
24 pivoting movement
25 locking hooks
26 Snap-in element
27 Guide groove

What is claimed is:

1. A fastening element for holding fluid conduit ends of a motor vehicle air conditioning system on an air conditioning system housing in a region of a conduit interface, the fastening element comprising:
a first U-shaped conduit clamping region formed between two opposing U-leg regions connected to one another by a curved or straight U-shaped base region configured to hold a first fluid conduit end and a second fluid conduit end oriented with a first axis and a second axis perpendicular to a longitudinal direction of the first U-shaped conduit clamping region and clamped into the first U-shaped conduit clamping region, wherein a first pivotable spacer is connected as an integrated component of the fastening element to a first one of the U-leg regions by a film hinge and at least partially fills or bridges the first U-shaped conduit clamping region by a pivoting movement in a direction of a second one of the U-leg regions, the first spacer defining a space between the first fluid conduit end and the second fluid conduit end respectively aligned with the first axis and the second axis perpendicular to the longitudinal direction of the first U-shaped conduit clamping region, the first fluid conduit end and the second fluid conduit end arranged one behind the other in the longitudinal direction of the first U-shaped conduit clamping region.

2. The fastening element according to claim 1, wherein the first spacer is integrally connected by the film hinge to one of the first one of the U-leg regions and the second one of the U-leg regions or is integral therewith.

3. The fastening element according to claim 1, further comprising a second U-shaped conduit clamping region disposed in a plane defined by the first U-shaped conduit clamping region, wherein the first U-shaped conduit clamping region and the second U-shaped conduit clamping region are formed together in a double U-shape with two outer U-leg regions and two inner U-leg regions.

4. The fastening element according to claim 3, further comprising a second spacer, the first spacer and the second spacer connected in each of the first U-shaped conduit clamping region and the second U-shaped conduit clamping region to one of the outer U-leg regions and configured to be pivoted in a direction of a respective one of the inner U-leg regions.

5. The fastening element according to claim 1, wherein a locking hook is provided for fixing the first spacer on the first one of the U-leg regions of the first U-shaped conduit clamping region, the locking hook disposed opposite the film hinge and configured to cooperate with a snap-in element formed on the spacer.

6. The fastening element according to any of claims 1, further comprising a guiding element formed on the fastening element configured to cooperate with a guide element on the air conditioning system housing for attaching the fastening element to the air conditioning system housing in the region of the conduit interface.

7. The fastening element according to claim 6, wherein the guide element includes guiding rails aligned parallel to the longitudinal direction of the first U-shaped conduit clamping region, the guide rails including guide grooves for attaching the fastening element to the air conditioning system housing.

8. The fastening element according to claim 1, further comprising a support region formed above or below a plane defined by the first U-shaped conduit clamping region configured to support fluid conduits in a direction of the first axis and the second axis.

9. The fastening element according to claim 8, wherein the support region is configured to support curved fluid conduits with fluid conduit sections that border the first fluid conduit end and the second fluid conduit end, and wherein an axis of each of the curved fluid conduits is perpendicular to the first axis and the second axis.

10. A method for attaching fluid conduit ends to the air conditioning system housing in the region of the conduit interface using the fastening element according to claim 1, the method comprising steps of:
a) pushing the fastening element with the first U-shaped conduit clamping region, which is released by folding out the first spacer, pivotable by means of the film hinge, onto the first fluid conduit end along a mounting direction which runs parallel to the longitudinal direction of the first U-shaped conduit clamping region and perpendicular to the first axis of the first fluid conduit end to receive the first fluid conduit end in the first U-shaped conduit clamping region,
b) attaching a fastening element to a housing part of the air conditioning system housing in the region of the conduit interface, and
c) folding in the first spacer to clamp the first conduit end in the first U-shaped conduit clamping region.

* * * * *